Patented Oct. 16, 1945

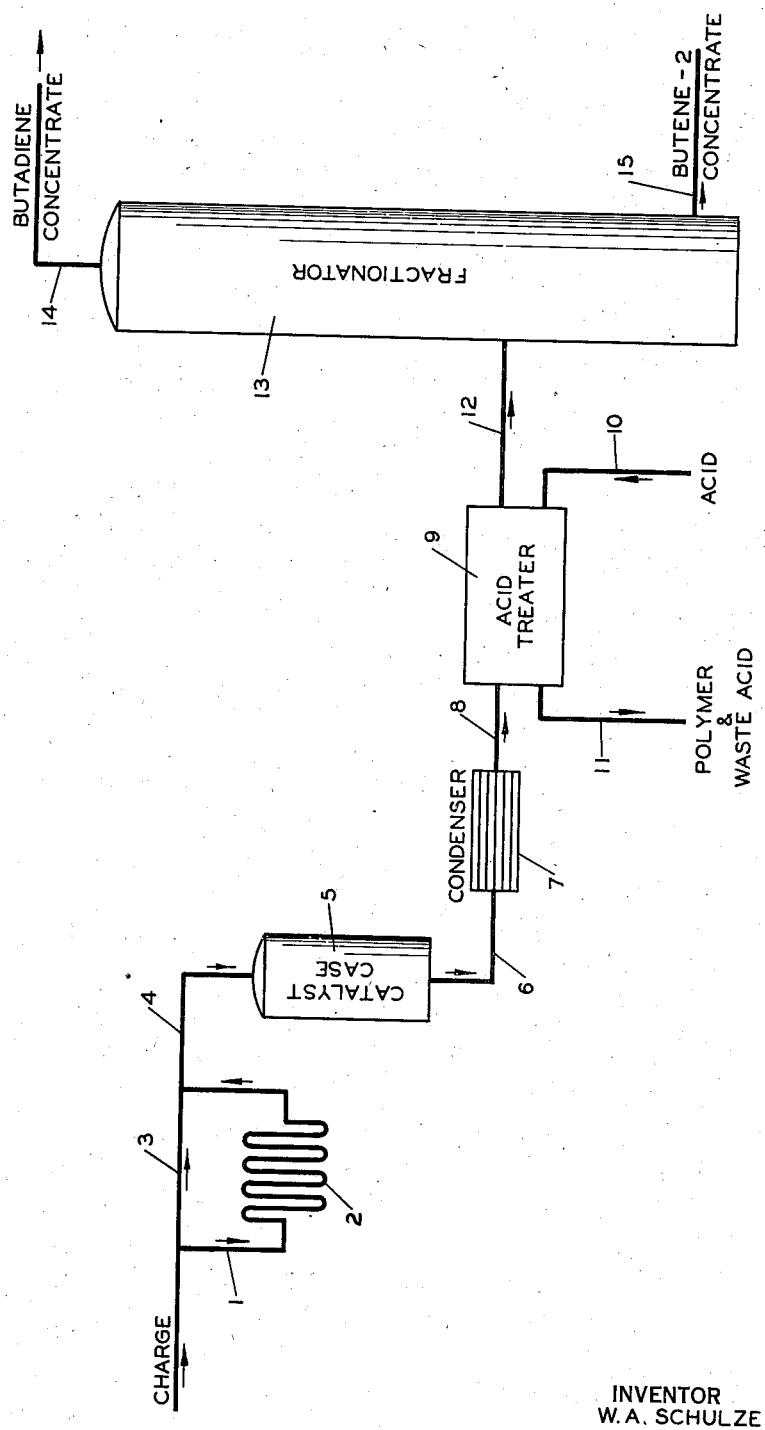

2,386,983

UNITED STATES PATENT OFFICE 2,386,983

PROCESS FOR THE TREATMENT OF HYDROCARBONS

Walter A. Schulze and John C. Hillyer, Bartlesville, Okla., assignors to Phillips Petroleum Company, a corporation of Delaware Application December 10, 1940, Serial No. 369,490

14 Claims. (Cl. 260—680)

This invention is directed to a process for obtaining butadiene from hydrocarbons and relates further to a process for separating butadiene from hydrocarbon mixtures containing the same. More particularly this process is concerned with the separation of butadiene from gas mixtures containing same in admixture with butane and butenes.

It is among principal objects of this invention to provide a simple and effective method for the preparation, concentration, separation and recovery of butadiene from gas mixtures in which it is formed or contained along with other hydrocarbons whose physical and chemical properties ordinarily render such separation difficult and complex. Further objects and advantages of the present invention will be readily apparent from a consideration of the factors discussed hereinbelow.

Heretofore it has been difficult to separate substantially pure butadiene from hydrocarbon mixtures, particularly those containing mono-olefinic $C_4$ hydrocarbons and other compounds whose boiling points lie close to that of butadiene. Normally, butadiene occurs or is produced in mixtures with considerable quantities of butenes and butanes as well as higher and lower boiling products. Thus, cracking still gases normally contain some butadiene, perhaps as much as one per cent under certain conditions, but always contain considerable butenes and butanes. The same is true when cracking heavier petroleum fractions or treating butane by cracking and/or dehydrogenation processes to produce butadiene since a very considerable quantity of other $C_4$ hydrocarbons is always present with the butadiene.

A $C_4$ hydrocarbon fraction of the type described may be readily isolated from higher and lower boiling fractions in substantially pure form by fractional distillation. Further separation of this complex fraction by distillation, however, has been difficult since the boiling points of all the components of this fraction are distributed over a relatively narrow range, as indicated below:

| Compound | Boiling point, °F. (760 mm. pressure) |
|---|---|
| Isobutane | 10 |
| Butene-1 | 20 |
| Isobutene | 21 |
| Butadiene | 23 |
| n-Butane | 31 |
| Trans butene-2 | 33 |
| Cis butene-2 | 39 |

With efficient fractionating equipment it is possible to effect satisfactory separations between certain of the $C_4$ hydrocarbons of the above mentioned mixture. In such equipment, while it is possible to separate isobutane on the lower-boiling side and a mixture of n-butane and the isomers of butene-2 on the higher-boiling side, the separation of butene-1, isobutene and butadiene into substantially pure components is almost impossible. As noted above, these three compounds boil within 3° F.

For this reason recourse has been had to processes for the separation of butadiene based on hydrocarbon type rather than on boiling range, usually subsequent to preliminary concentration of $C_4$ fractions by fractionation. By these processes we mean chemical separations such as absorptions in sulfuric acid or reaction with cuprous solutions or sulfur dioxide, as well as physical types of separation such as solvent extraction and the like, whereby the classes of mono-olefins, diolefins, and paraffins may be separated from each other. These separations, however, have suffered from certain disadvantages. They have to a certain extent lacked specificity and it has therefore not been possible to effect a relatively complete concentration of the butadiene. While separation of unsaturates from paraffins has been carried out fairly satisfactorily, the further separation of the mono-olefins from the diolefins has been much more difficult because of the similarity of the reactive group in each.

We have now found that butadiene may be separated from a $C_4$ hydrocarbon mixture and a concentrate rich in butadiene prepared by a process comprising the proper selection and/or sequence of the steps of (1) removing isobutane by fractionation, (2) isomerizing butene-1 to butene-2, (3) removing isobutene by means such as absorption in sulfuric acid or selective polymerization, and (4) fractional distillation to give a butadiene concentrate.

We have found that when isobutene and butene-1 are absent or are reduced to very low concentrations it is possible to prepare a product much higher in butadiene by means of simple fractional distillation than has heretofore been possible. If these compounds, which cannot be separated from butadiene by fractionation, remain in the mixture in minor quantities after the first two steps, the final concentration of butadiene attained is related inversely to the quantity of these hydrocarbons remaining.

We have also found that the conversion of butene-1 to butene-2 which is readily accomplished by means of catalytic isomerization at low temperature offers a means whereby nearly all the normal butenes may readily be recovered by fractionation in the form of a butene-2 concentrate without excessive loss or contamination.

The process according to our invention may be more readily understood by referring to the accompanying drawing which represents schematically one type of apparatus in which our process can be used.

The figure shows a $C_4$ hydrocarbon fraction, such as that derived from cracking still vapors, dehydrogenation of butenes, or similar processes entering the system through line 1 into heater 2, which may be either a heat exchanger or furnace type heater. The heated vapors pass by line 4 into catalyst cases 5, in which isomerization of butene-1 to butene-2 is carried out. If the charge is already at the proper temperature it may pass by line 3 direct to the catalyst. The treated vapors pass by line 6 through condenser 7, and the liquid from 7 passes through line 8 to acid treater 9 for the removal of isobutene. Fresh acid enters treater 9 through line 10, while spent acid and acid-soluble compounds are removed through line 11. The hydrocarbon liquid from this acid treater is then delivered through line 12 to the fractionating unit 13, where, by the application of suitable heat and pressure, the distillation is carried out. The overhead passing through line 14 consists of butadiene and small portions of unconverted butene-1, while the bottoms fraction leaving by line 15 consists of the isomers of butene-2 and a large portion of the normal butane.

In one specific embodiment of the invention, the $C_4$ fraction containing butenes, butadiene and butanes is de-isobutanized, and passed in the vapor form over a catalyst of an acidic nature, such as dilute phosphoric acid supported on an inert carrier such as silica gel, at a temperature in the range 200 to 600° F. and at flow rates equivalent to 0.5 to 5 liquid volumes per hour per volume of catalyst, to isomerize butene-1 to butene-2. The vapors are cooled and condensed and washed with sulfuric acid of 60 to 70 per cent concentration, thereby absorbing the isobutene present. The acid-treated stream is then subjected to fractional distillation in which an overhead fraction of butadiene and a bottom fraction comprising butane and butene-2 isomers is obtained.

The isomerization reaction is based on the fact that butene-1 exists in equilibrium with butenes-2, and that the relative amounts of the isomers present varies with the temperature. We have found that low temperatures favor the butene-2 isomers as against butene-1, and that in processes for carrying out the isomerization of butene-1 temperatures should be kept as low as practicable and a catalyst should be employed to obtain rapid reaction. The selection of an operating temperature is dependent, of course, on additional factors, particularly the activity of the catalyst and the extent of undesirable side reactions occurring. We have found that even in the presence of catalysts, reaction proceeds slowly below 100° F. and temperatures of 150 to 600° F. or even higher are desirable. In the isomerization step, splitting and coking reactions are unimportant at temperatures within this range, but polymerization of the olefins to form octenes or the like may occur. Polymerization is favored by low temperatures also but since it results in considerable removal of isobutene as the most readily polymerized component it is not usually considered as detrimental to our process unless appreciable amounts of butadiene are also consumed.

As catalysts for our isomerization step we prefer to employ diluted strong mineral acids and/or acid salt materials either alone, in solution as mixtures, or adsorbed on carriers. We prefer to use catalysts which are highly active so that lower isomerization temperatures may be employed. Acidic salts such as aluminum phosphate and the like may be used. Even more active, however, are solutions of sulfuric or phosphoric acids adsorbed on suitable carriers whereby the acid strength is maintained at values below the range which would cause polymerization of the butadiene.

It is not to be understood from the foregoing description of one specific method of carrying out the isomerization of butene-1 to butene-2 that the application of the invention is limited thereto. This invention contemplates the use of catalytic isomerization as the first step in a process of concentrating butadiene. The means whereby this substantially complete isomerization of butene-1 is carried out to butene-2 may be selected at will from a variety of methods, using one of the many different catalysts known to the art.

The removal of isobutene from the hydrocarbon mixture may be readily carried out by absorption in sulfuric acid solution. Usually acid strengths of 60 to 75 per cent are employed for rapid absorption of isobutene with only slight absorption of normal butenes. When dealing with a hydrocarbon mixture containing butadiene, however, solutions of about 70 per cent or more acid are less satisfactory because of considerable absorption of butadiene, which is rather more reactive than the normal butenes. To achieve a relatively clean cut separation of isobutene without loss of butadiene, solutions of less than 70 per cent and preferably of 65 to 70 per cent acid are used with treating temperatures maintained below about 100° F. By treatment with these acid solutions, the isobutene content of the hydrocarbon mixture may be substantially removed without loss of appreciable quantities of butadiene. We prefer to carry out this acid-absorption step subsequent to the isomerization step but it may be carried out prior thereto. If desired, the absorption may be effected subsequent to the fractional distillation. With mixtures containing a low concentration of butadiene the isomerization and acid-absorption steps may even be combined using a single acid solution catalyst to promote the isomerization of butene-1 and the polymerization of isobutene. Such a combination, however, may result in larger losses of butadiene through polymerization at elevated temperatures in the presence of strong acids.

Other methods of removing the isobutene from the gas mixture may be employed, for instance selective polymerization of the highly reactive isobutene over suitable well known catalysts such as phosphoric acid to form di-isobutene or copolymers of iso and normal butenes.

Following the steps of isomerization of butene-1 and absorption of the isobutene, the $C_4$ mixture comprises essentially butadiene, n-butane and the isomers of butene-2. This fraction is well adapted to fractional distillation for segregation of butadiene since the boiling point of the butadiene differs by 8° F. or more from the boiling points of the other hydrocarbons present.

The butadiene stream removed is highly concentrated, the exact composition depending on the initial concentration and the completeness with which butene-1 and isobutene were removed prior to fractionation. In general, from gases containing initially more than ten per cent of butadiene, concentrates of 90 per cent and above may be obtained. From gases containing initially a greater quantity of butadiene, such as those obtained from gas cracking, having 30 to 50 per cent butadiene, concentrates of 95 per cent or even higher up to substantially pure butadiene are obtained.

This process may very conveniently be applied to the process of catalytically dehydrogenating butane or butenes to butadiene. Indeed, it may be integrated into such a process as a most convenient and economical step requiring only a bare minimum of equipment. Since the dehydrogenation step is ordinarily carried out at high temperatures of 1000 to 1300° F., and the effluents are then immediately cooled and subjected to fractionation, catalyst chambers for the isomerization step operating in the range of 200 to 600° F. may be inserted by merely dividing the aforesaid cooling into two stages. Also, since isobutene is often present in small quantity in said dehydrogenation processes, usually no provision for acid treatment need be made at least until after the fractionation step when the volume to be treated will be greatly reduced.

Many modifications of our process are possible, depending on the particular hydrocarbon mixture undergoing treatment and the most efficient combination or sequence of the steps of said process. Thus when isobutane and isobutene are substantially absent from a mixture, the de-isobutanizing and acid-absorption steps may be omitted, and isomerization alone followed by fractionation will produce a high-purity butadiene concentrate. Also successive treatments of the butadiene-rich fraction by our process or by any individual steps thereof to increase the purity of the butadiene concentrate may be desirable. For example, a fraction consisting of butene-1 and butadiene and produced by our process may be given a second isomerization treatment and refractionated to remove the major portion of the mono-olefins. These and other modifications of our process will be obvious to those skilled in the art and thus are within the scope of our invention.

The following examples will still further illustrate specific applications of the process of the present invention, but are not to be construed as limitations thereof.

EXAMPLE I

A C$_4$ fraction obtained from the products of cracking an ethane-propane mixture was found to have the composition indicated in the first column of the following table. A portion of this material was subjected to fractional distillation in conventional equipment, and a butadiene concentrate containing about 62 per cent butadiene along with isobutene and butene-1 was obtained.

Another portion of this C$_4$ fraction was de-isobutanized by fractionation, and washed in liquid phase for the removal of isobutene. The acid washed material was then fractionated, with products obtained as listed below:

Table I

| Hydrocarbon | Composition, vol. per cent | | | |
|---|---|---|---|---|
| | Raw feed | Fractionator charge | Overhead | Bottoms |
| Isobutane | 1.0 | | | |
| Isobutene | 5.6 | | | |
| Butene-1 | 17.0 | 17.3 | 29.1 | |
| Butadiene | 39.9 | 42.7 | 70.9 | |
| n-Butane | 3.2 | 3.4 | | 8.5 |
| Butenes-2 | 33.3 | 36.6 | | 91.5 |
| Per cent of raw feed | 100 | 91.8 | 54.8 | 36.9 |

Thus by removal of isobutene prior to fractionation, a butadiene concentrate containing about 70 per cent of butadiene was obtained as compared to about 62 per cent in the first-mentioned fractionation in which only isobutane was completely eliminated.

A third portion of this C$_4$ material was treated by the successive steps of our process. The material was first de-isobutanized, then treated at 200° F. over an isomerization catalyst to obtain equilibrium concentration of butenes-2. The catalyst consisted of silica gel impregnated with 10 per cent by weight of 40 per cent sulfuric acid. The effluents from the isomerization were cooled and condensed and washed with 65 per cent sulfuric acid, and the isobutene free material was then fractionated with the products obtained as listed below.

Table II

| Hydrocarbon | Composition, vol. per cent | | | | |
|---|---|---|---|---|---|
| | Raw feed | Isomerized product | Acid treated fractionation feed | Overhead | Bottoms |
| Isobutane | 1.0 | | | | |
| Isobutene | 5.6 | 4.1 | | | |
| Butene-1 | 17.0 | 3.3 | 3.4 | 7.5 | |
| Butadiene | 39.9 | 41.5 | 43.0 | 92.5 | 1.8 |
| n-Butane | 3.2 | 3.3 | 3.4 | | 6.2 |
| Butenes-2 | 33.3 | 47.8 | 50.2 | | 92.0 |
| Per cent of raw feed | 100 | 96.4 | 91.8 | 41.6 | 50.1 |

The overhead product thus obtained by isomerization followed by removal of isobutene contained almost 93 per cent of butadiene as compared with 62 per cent for simple fractionation and 70 per cent for isobutene removal followed by fractionation.

A portion of the acid-treated fractionator feed listed in Table II was submitted to batch-type distillation whereby butene-1 was first taken overhead and a butadiene fraction was taken over following. The butadiene fraction thus obtained contained slightly more than 98 per cent butadiene. In this operation, the butene-1 fraction containing some butadiene was recycled with the raw feed to the previously mentioned treating steps and the butadiene was thus recovered. This recycling operation was possible because of the continuous conversion of butene-1 to butene-2 in the isomerization step which prevented the pyramiding of butene-1 in the raw feed-recycle mixture.

A portion of the fractionator overhead product listed in Table II was given a second treatment over an isomerization catalyst such as referred to above, at 200° F., re-condensed and re-fractionated. The results of this treatment are listed below:

Table III

| Hydrocarbon | Composition, vol. per cent | | | |
|---|---|---|---|---|
| | Charge | Fractionator feed | Overhead | Bottoms |
| Butene-1 | 7.3 | 0.4 | 0.4 | |
| Butadiene | 92.7 | 92.7 | 99.6 | |
| Butenes-2 | | 6.9 | | 100 |
| Per cent of raw feed | 42.5 | 42.5 | 39.5 | 3.0 |

EXAMPLE II

The effluent vapors from the catalytic dehydrogenation of butenes were cooled and the C$_4$ fraction separated free of isobutane. The resulting C$_4$ stock had the composition listed for the raw feed in Table IV below. The raw feed was vaporized and passed at a temperature of 200° F.

over a catalyst consisting of silica gel impregnated with 10 per cent by weight of 40 per cent sulfuric acid. The effluents from the isomerization catatlysts were condensed and the condensate was washed with 65 per cent sulfuric acid at atmospheric temperature. The acid treated condensate was then fed to a fractionating column wherein butadiene was separated as an overhead fraction. The composition of the products is shown in the following table:

Table IV

| Hydrocarbon | Composition, vol. per cent | | | |
|---|---|---|---|---|
| | Raw feed | Fractionator feed | Overhead | Bottoms |
| Isobutene | 0.9 | | | |
| Butene-1 | 26.6 | 5.1 | 21.0 | |
| Butadiene | 19.5 | 19.7 | 79.0 | 0.7 |
| n-Butane | 1.0 | 1.0 | | 1.3 |
| Butenes-2 | 52.0 | 74.2 | | 98.0 |
| Per cent of raw feed | 100 | 99 | 24.0 | 75.0 |

The butadiene concentrate thus produced was almost 80 per cent pure, and a second isomerization step applied to this overhead fraction followed by fractionation produced a concentrate containing over 98 per cent butadiene.

In the foregoing specification and in the claims, the butene-2 referred to ordinarily describes either or both butene-2 isomers in proportions which depend on the material being treated and the conditions under which said isomers are formed. For purposes of convenience, therefore, butene-2 will describe a portion containing either or both of said isomeric forms.

While we have described our invention in a detailed manner and provided specific examples illustrating suitable modes of executing the same, no limitations are thereby implied other than those imposed by the appended claims.

We claim:

1. A process for the separation of butadiene from a $C_4$ hydrocarbon mixture comprising n-butane, butadiene, isobutane, butene-1 and isobutene, which comprises fractionating said mixture to remove isobutane, contacting the deisobutanized mixture with an isomerization catalyst under suitable conditions to convert butene-1 to butene-2, selectively removing the isobutene from the effluents of the isomerization treatment and subjecting the substantially isobutene free mixture to fractional distillation to produce an overhead fraction comprising butadiene and a bottoms fraction comprising n-butane and butene-2.

2. A process for the separation of butadiene from a $C_4$ hydrocarbon mixture comprising butane, isobutane, butadiene, butene-1 and isobutene, which comprises fractionating said mixture to remove isobutane, contacting the deisobutanized mixture with an isomerization catalyst to convert butene-1 to butene-2, selectively removing isobutene from the effluents of the isomerization treatment by acid absorption, and fractionally distilling the resulting mixture to produce an overhead fraction comprising butadiene and a bottoms fraction comprising butane and butene-2.

3. A process for the separation of butadiene from a $C_4$ hydrocarbon mixture containing n-butane, butadiene, and butene-1 which comprises contacting said mixture with an isomerization catalyst to convert butene-1 to butene-2, and fractionally distilling the resulting mixture to produce an overhead fraction comprising butadiene and a bottoms fraction comprising n-butane and butene-2.

4. A process for the separation of butadiene from a $C_4$ hydrocarbon mixture containing n-butane, butene-1 and butadiene which comprises contacting said mixture with an isomerization catalyst to convert a substantial proportion of the butene-1 to butene-2, fractionally distilling the resulting mixture to produce an overhead fraction comprising butadiene and butene-1 and a bottoms fraction comprising n-butane and butene-2, treating said overhead fraction in a second catalytic isomerization stage to convert a further amount of butene-1 to butene-2, and finally distilling the effluents of the second isomerization step to produce an overhead fraction substantially comprising butadiene and a bottoms fraction comprising butene-2.

5. In the process of producing butadiene by the catalytic dehydrogenation of n-butenes, the method of separating butadiene from the $C_4$ hydrocarbon mixture comprising butene-1, butadiene, and isobutene resulting from said dehydrogenation which comprises the steps of catalytically isomerizing said mixture to convert butene-1 to butene-2, selectively removing isobutene from the effluents of the isomerization treatment, and subjecting the resulting mixture to fractional distillation to produce an overhead fraction comprising butadiene and a bottoms fraction comprising butene-2.

6. A process for the separation of butadiene from a $C_4$ hydrocarbon mixture comprising n-butane, butadiene, isobutane, butene-1, and isobutene which comprises fractionating said mixture to remove isobutane, isomerizing a substantial proportion of the butene-1 to butene-2, selectively removing isobutene from the effluents of the isomerization treatment by acid absorption, subjecting the substantially isobutene-free mixture to fractional distillation to produce an overhead fraction comprising butadiene and butene-1 and a bottoms fraction comprising n-butane and butene-2, treating said overhead fraction in a second isomerization stage to convert a further proportion of the butene-1 to butene-2 and finally distilling the effluents of the second isomerization step to produce an overhead fraction substantially comprising butadiene and a bottoms fraction comprising butene-2.

7. A process for the separation of butadiene from a $C_4$ hydrocarbon mixture comprising n-butane, butadiene, butene-1, and iso-butene, which comprises isomerizing a substantial proportion of the butene-1 to butene-2, selectively removing isobutene from the effluents of the isomerization treatment by acid absorption, subjecting the substantially isobutene-free mixture to fractional distillation to produce an overhead fraction comprising butadiene and butene-1 and a bottoms fraction comprising n-butane and butene-2, treating said overhead fraction in a second isomerization stage to convert a further proportion of the butene-1 to butene-2 and finally distilling the effluents of the second isomerization step to produce an overhead fraction substantially comprising butadiene and a bottoms fraction comprising butene-2.

8. In a process of producing butadiene which comprises catalytically dehydrogenating hydrocarbons selected from the group consisting of butanes and the butenes to form a $C_4$ hydrocarbon mixture comprising butene-1 and butadiene, the steps of contacting said mixture with isomerization catalyst to convert butene-1 to butene-2 and fractionally distilling the resulting mixture to produce an overhead fraction comprising butadiene.

9. In a process of producing butadiene which comprises catalytically dehydrogenating hydrocarbons selected from the group consisting of butane and the butenes to form a $C_4$ hydrocarbon mixture comprising butene-1, isobutene and butadiene, the steps of contacting said mixture with isomerization catalyst to convert butene-1 to butene-2, fractionally distilling resulting mixture to produce an overhead fraction comprising butadiene and isobutene, washing said overhead fraction with acid for the removal of isobutene and recovering the remaining butadiene.

10. A process for the separation of butadiene from a $C_4$ hydrocarbon mixture comprising n-butane, butadiene, butene-1, and isobutene which comprises contacting said mixture with an isomerization catalyst to convert butene-1 to butene-2, selectively removing isobutene from the effluents of the isomerization treatment by acid absorption, and fractionally distilling the resulting mixture to produce an overhead fraction comprising butadiene and a bottoms fraction comprising butane and butene-2.

11. A process for the separation of butadiene from admixture with butene-1 which comprises catalytically isomerizing the butene-1 in said mixture to butene-2, and fractionally distilling the isomerized mixture to separate the butadiene in an overhead fraction.

12. A process for the separation of butadiene from a hydrocarbon mixture comprising butane, isobutane, isobutene, butadiene, and butene-1 which comprises fractionating said mixture to remove isobutane, contacting the isobutanized mixture with an isomerization catalyst to convert a substantial proportion of the butene-1 to butene-2, selectively removing the isobutene from the effluents of the isomerization treatment, subjecting the substantially isobutene free mixture to fractional distillation to take overhead a first fraction containing unisomerized butene-1 and a minor proportion of the butadiene and a second fraction containing a major proportion of the butadiene, and recycling the first fraction containing butene-1 into the isomerization stage.

13. A process for the separation of butadiene from a $C_4$ hydrocarbon mixture comprising n-butane, butadiene, butene-1 and isobutene which comprises contacting said mixture with an isomerization catalyst to convert butene-1 to butene-2, selectively removing isobutene from the effluents of the isomerization treatment by catalytic polymerization, and fractionally distilling the resulting mixture to produce an overhead fraction comprising butadiene and a bottoms fraction comprising butane and butene-2.

14. A process for the separation of butadiene from admixture with butene-1 which comprises contacting said mixture with an isomerizing catalyst to obtain substantial conversion of butene-1 to butene-2, fractionally distilling butadiene and unisomerized butene-1 as an overhead fraction and recovering butene-2 as a bottom fraction, contacting the butadiene and butene-1 mixture recovered overhead with an isomerizing catalyst in a second isomerizing stage to convert a further proportion of the remaining butene-1 to butene-2, and fractionally distilling the effluents of the second isomerization stage to produce an overhead fraction essentially comprising butadiene, and a bottom fraction comprising butene-2.

WALTER A. SCHULZE.
JOHN C. HILLYER.